Jan. 7, 1941.　　　　R. C. ANGELL　　　　2,227,565
DENTAL EQUIPMENT MECHANISM
Original Filed April 5, 1939　　4 Sheets-Sheet 3
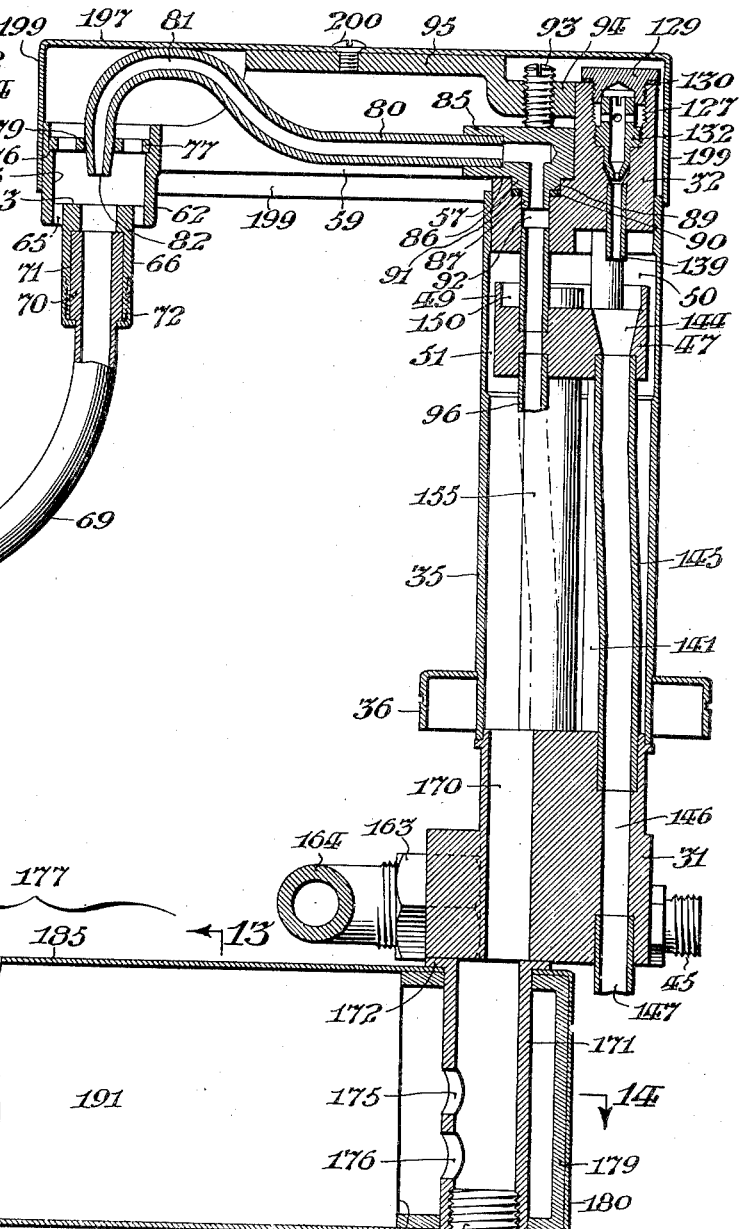
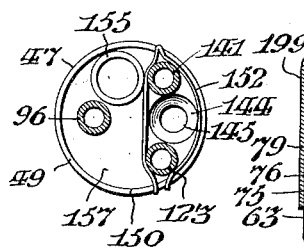
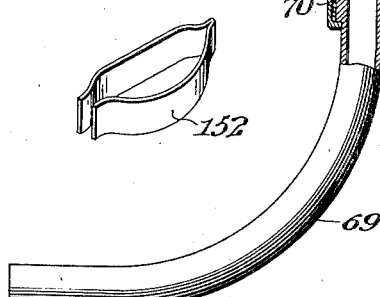
INVENTOR
Robert C. Angell,
BY
Clifton C. Hallowell
ATTORNEY

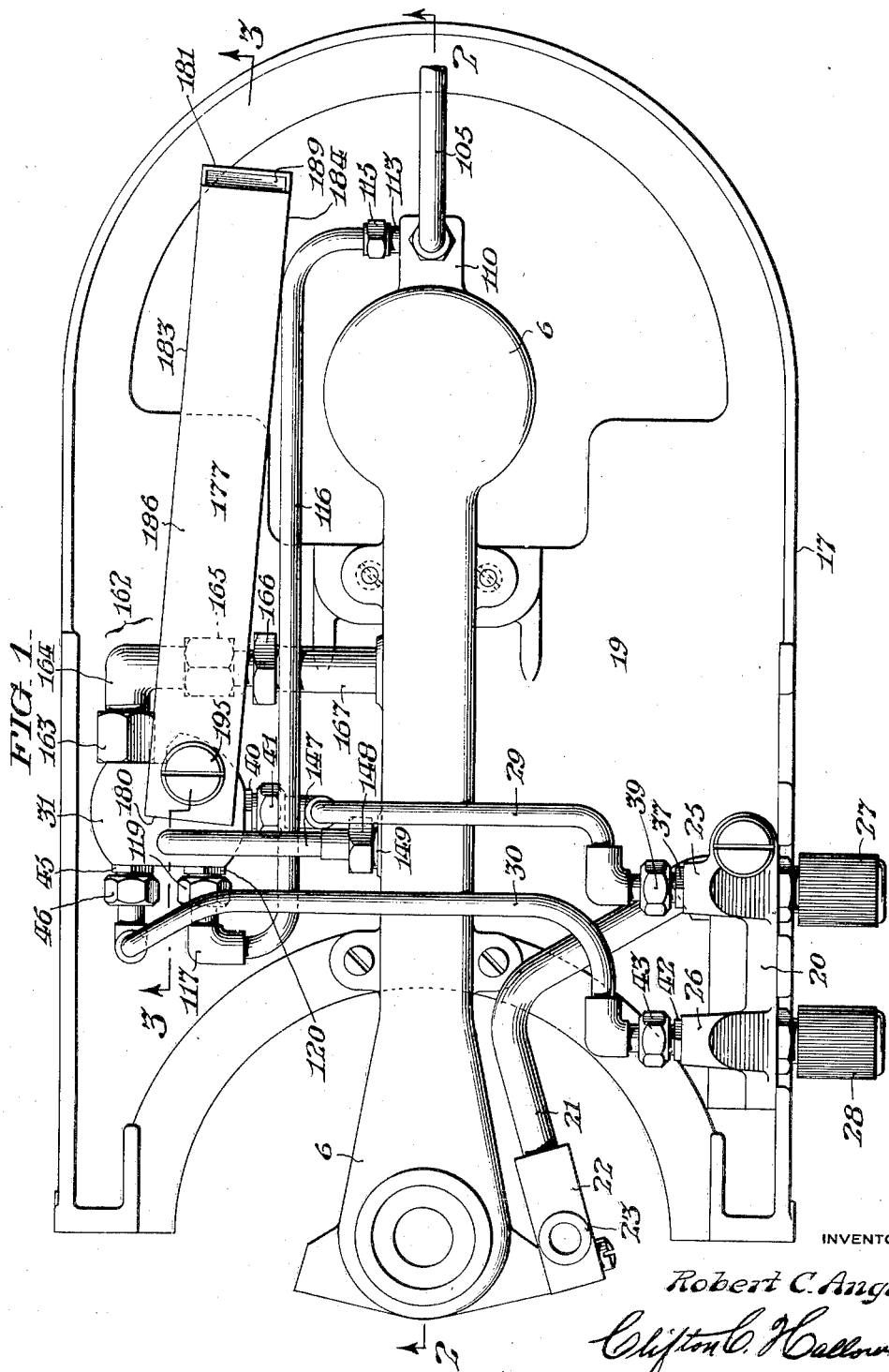

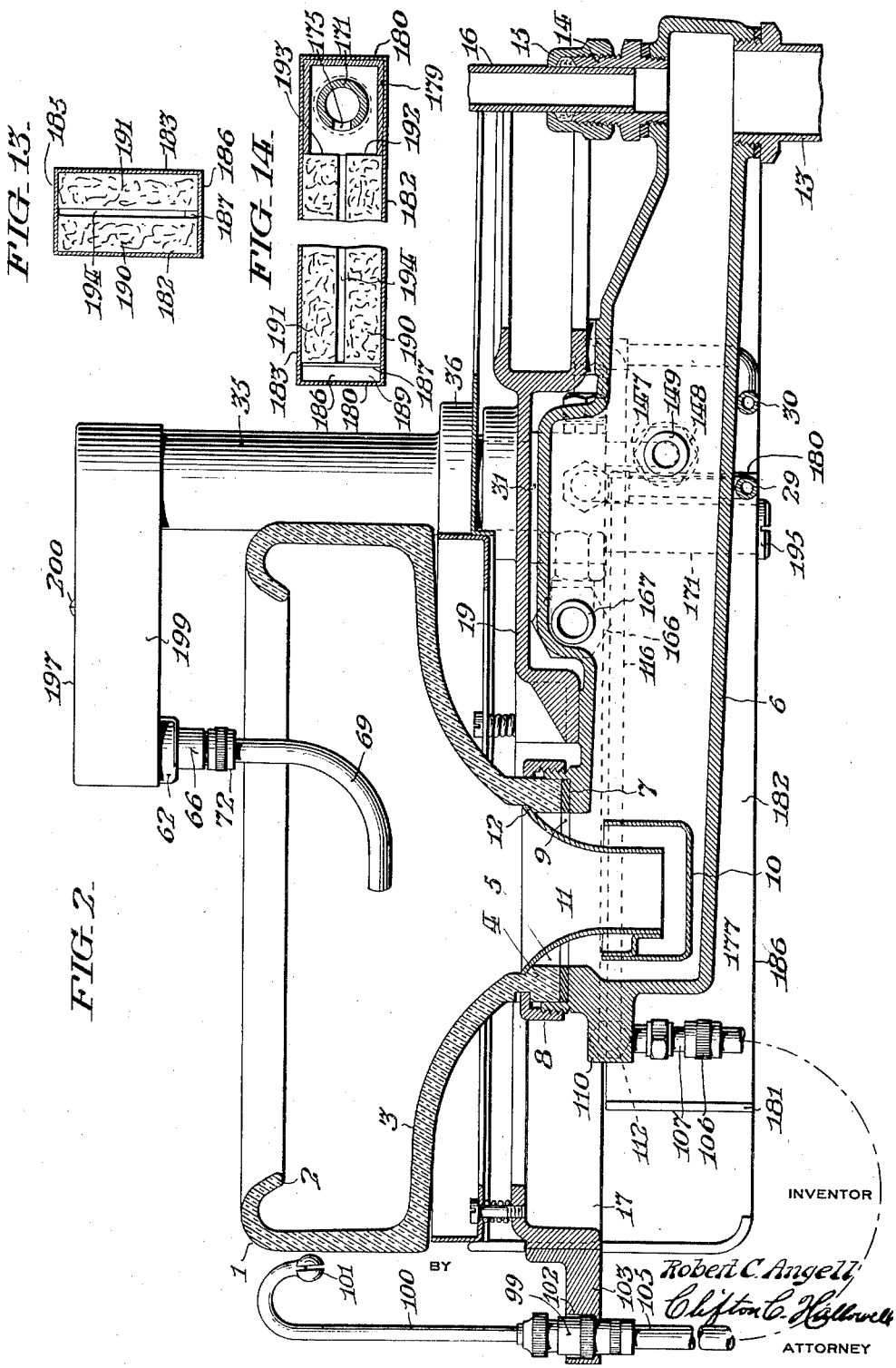

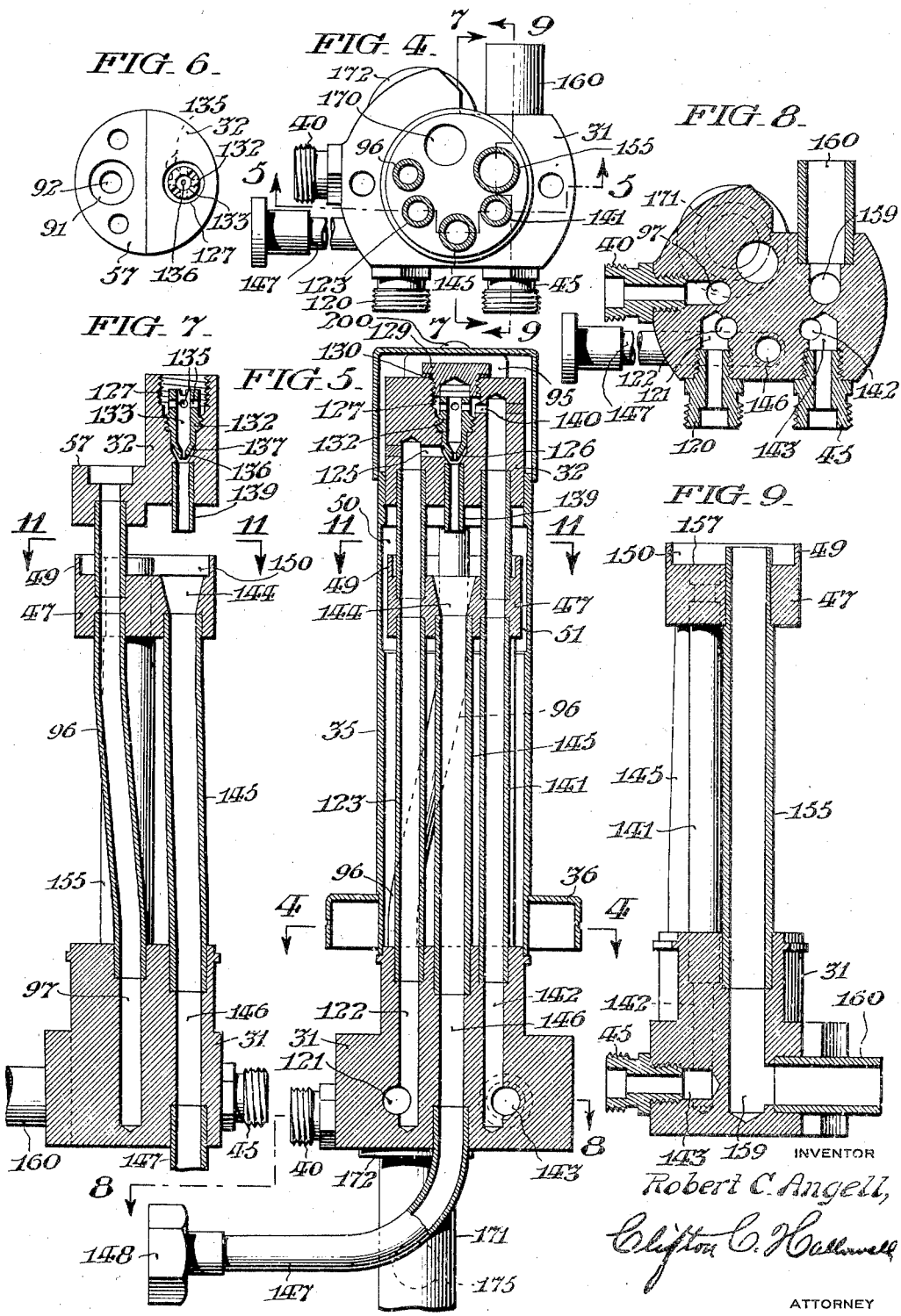

Patented Jan. 7, 1941

2,227,565

UNITED STATES PATENT OFFICE 2,227,565

DENTAL EQUIPMENT MECHANISM

Robert C. Angell, Prince Bay, N. Y., assignor to The S. S. White Dental Manufacturing Company, a corporation of Pennsylvania Continuation of application Serial No. 266,174, April 5, 1939. This application August 11, 1939, Serial No. 289,652

16 Claims. (Cl. 4—263)

My invention relates particularly to systems of water distribution and drainage in cuspidor and saliva ejector combinations, and is especially directed to the prevention of so called back siphonage or cross connection of water supply and waste or drainage systems, and to the arrest or absorption of vibrations creating objectionable noises or sounds incident to the flow of water in the cuspidor flush and saliva ejector aspirator passageways and the incident unbalanced air pressures, and includes certain novel features of construction and arrangement as illustrated in my pending application Serial No. 266,174, of which this application is a continuation.

The principal objects of my invention are to provide a compact assembly of water distributing and air pressure venting mechanism for the cuspidor drain outlet, the saliva ejector, and its aspirator, and including means arranged to prevent contamination of the water supply with the drainage in the drain outlet system.

Other objects of my invention are to provide means arranged to direct water from the water supply system into the cuspidor bowl through a flush nozzle extended into said bowl, and to project said water, in passage from said system to said nozzle, through an air gap, which is in communication with the atmosphere, and which is disposed above the plane of the upper edge of the cuspidor bowl, said edge serving as a spillway in event of accidental stoppage of the drainage system and consequent flooding by backing up of the drainage into said bowl, and determining the level to which said drainage may rise in any part of the assembly.

Further objects of my invention are to provide an aspirator connected to create a partial vacuum in the tube connecting it with the saliva ejector, and having its free discharge end so spaced from the intake end of the drain conducting conduit that the water from the supply system is projected in an open stream through the air gap disposed between said discharge and intake ends and located above the plane of the drainage spillway, whereby drainage is prevented from being sucked back into the water supply system through said aspirator in event of a drop in pressure of said system.

My invention further includes vents which connect the drainage system with the atmosphere through an elongated narrow passageway having walls composed of nonresonant material and having characteristics tending to muffle the sound of air escaping from or entering into the drainage system, as the case may be, to equalize the air pressure in said drainage system with the atmosphere.

My invention comprehends a fluid distributing column comprising a base and head and an interposed drip receiving cup and including a plurality of tubular conduits enclosed in a housing, and respectively arranged to convey supply water for the cuspidor bowl flush and saliva ejector aspirator, drainage from said aspirator and air for equalizing the pressure in the drainage system, said housing being readily removed and replaced and itself serving as an air vent passageway.

Specifically stated, the form of my invention as hereinafter described in more specific detail, comprises in combination a horizontally movable bracket arm frame and adapted to swingably support a cuspidor bowl, a fluid conveying and distributing column, composed of a plurality of tubular passageways, valves connected to control the flow of water from a water supply system through said column, a saliva ejector connected with saliva ejector suction operating mechanism, including an aspirator, disposed within the column structure, a drain conduit leading to a suitably provided drain outlet system, air chambers disposed between the water supply system and the drain outlet system affording air gaps through which water from the water supply system is projected in an open stream in passing to the drain outlet system, and a noise eliminating muffler connecting the air chamber therein with the atmosphere and tending to effect equalization or balance of the air pressure therein with the atmospheric pressure, and comprising an elongated narrow air passageway extending between walls of nonresonant material which is especially fabricated to provide sound deadening or noise absorbing characteristics.

My invention also includes all of the various novel features of construction and arrangement as hereinafter more definitely specified.

In the accompanying drawings Figure 1 is an inverted plan view of the cuspidor supporting arm which, as shown in my application Serial No. 266,174, is strapped to the supporting standard frame structure and arranged for horizontal oscillation about the axis of the pedestal into different convenient positions, as may be desired; Fig. 2 is a central vertical sectional view of said cuspidor supporting arm taken along its medial vertical plane on the line 2—2 in Fig. 1, and extending through the cuspidor bowl and its connected drain outlet, which are carried thereby, the water distributing column for the cuspidor flush and saliva ejector suction means being shown in elevation mounted on said cuspidor supporting bracket arm behind the plane of section; Fig. 3 is a central vertical sectional view taken through the water distributing column, including its head and base and attached sound muffler, on the line 3—3 in Fig. 1; Fig. 4 is a horizontal plan sectional view of the water distributing column, exclusive of the casing sleeve or housing, taken on the line 4—4 in Fig. 5 and particularly showing the base of said water distributing column, and its several inlet and outlet connections; Fig. 5 is a transverse vertical sectional view of the water distributing column shown in Figs. 2 and 3 taken on the line 5—5 in Fig. 4, and including the column head and associated shield or cover for the cuspidor flush supporting bracket arm; Fig. 6 is a plan view of the water distributing head shown in Figs. 3 and 5, and particularly as illustrated in Fig. 7; Fig. 7 is a transverse vertical sectional view of the water distributing column taken on the line 7—7 in Fig. 4; Fig. 8 is a horizontal sectional view taken through the base on the line 8—8 in Fig. 5; Fig. 9 is a transverse vertical sectional view of the water distributing column taken on the line 9—9 in Fig. 4; Fig. 10 is a plan view, on a reduced scale, of the cuspidor flush nozzle pipe supporting bracket arm and the column head by which it is detachably supported; Fig. 11 is a plan sectional view of the water distributing column, taken on a plane between the head and subjacent cup on the line 11—11 in Figs. 5 and 7, and showing the splash or spray guard which is omitted from said Figs. 5 and 7 for convenience of illustration; Fig. 12 is a perspective view of the splash or spray guard depicted in Fig. 11; Fig. 13 is a transverse vertical sectional view of the noise suppressing or absorbing muffler shown in Figs. 1, 2 and 3, taken on the line 13—13 in Fig. 3; and Fig. 14 is a longitudinal horizontal sectional view of said muffler taken on the line 14—14 in Fig. 3.

In said figures, the cuspidor bowl 1 having the peripheral inturned lip 2, the downwardly curved floor 3, and hub 4 providing the outlet orifice 5, is supported at the outer free end of the drain fixture 6 and rests on the annular seat 7 to which it is detachably engaged by the inwardly flanged annular nut 8 with the interposed leak proof washer 9.

The outlet orifice 5, as shown in Fig. 2, is provided with the water sealed trap comprising the water containing trap cup 10 supported by the hopper-like funnel 11 having its outwardly flared upper periphery resting upon the annular seat 12 provided in the wall of said outlet orifice.

The drain fixture 6 is provided with the depending nipple 13, which may be rotatably connected with a waste outlet pipe, not shown, through which the waste water from the cuspidor bowl 1 may be directed as it is discharged from the drain fixture 6. Said drain fixture 6 is also provided with the upwardly extending nipple 14 which is rotatably connected by the gland 15 to the depending waste pipe 16 arranged to direct waste water from any source of waste, such as the water tumbler fountain, not herein illustrated, but which may be provided with the usual trap.

The drain fixture 6 is supported by the cuspidor bracket arm frame 17, which is rotatably mounted to oscillate horizontally about the axis of the supporting pedestal, as shown in said application Serial No. 266,174.

Disposed beneath the floor 19 of the cuspidor bracket arm frame 17 is the valve body 20 which is connected by the pipe 21 with the fitting 22 having the nipple 23 to which may be connected a suitable water supply conveyer, such as the flexible tubing as shown in said application Serial No. 266,174.

Said valve body 20 conveniently embodies the valves 25 and 26 respectively controlled by the valve actuating knobs 27 and 28, and said valves are respectively connected by the pipes 29 and 30 with the base 31 of the fluid conveying column comprising the several tubes or pipes providing passageways to be hereinafter described, and including the distributing head 32 and the tubular casing or housing 35 having the flanged collar 36, as shown in Figs. 2, 3 and 5.

As shown in Fig. 1, the pipe 29 is detachably connected with the nipple 37 of the valve 25 by the coupling nut 39 and is connected with the base nipple 40 by the coupling nut 41. Similarly, the pipe 30 is detachably connected with the nipple 42 of the valve 26 by the coupling nut 43 and is connected with the base nipple 45 by the coupling nut 46.

Interposed between the base 31 and the head 32, and preferably nearer the latter and of slightly less diameter, is the drip receiving cup 47 having the upturned flange 49 and providing the annular space between the inner surface of the tubular casing 36 and the outer surface of the cup 47 and affording a passageway 51 for the free circulation of air into and out of the chamber 50 between said head 32 and drip receiving cup 47.

As best shown in Figs. 3 and 7, the head 32 of the water distributing column is provided with the downwardly stepped shelf 57 and carries the forwardly projecting bracket arm 59 which in transverse section is generally inverted U-shaped, and its inner end region is removably attached to said shelf 57 by the screws 60 and 61, see Fig. 10, and terminates at its free end in a circular pocket 62 having its bottom wall 63 provided with the perforations 65 and having the depending nipple 66.

The cuspidor flush nozzle pipe 69, as shown in Fig. 3, curves downwardly and outwardly into the cuspidor bowl 1, as shown in Fig. 2, and has its enlarged inner end 70, see Fig. 3, swivelly engaged in the suitably provided socket 71 by the inwardly flanged thimble 72, which is threadedly engaged with said depending nipple 66.

The inner wall 75 of the pocket 62 is internally recessed near its upper end and affords a shoulder 76 upon which rests the perforated diaphragm 77 having the central aperture 79 disposed in axial alinement with the inner enlarged end of the cuspidor flush nozzle pipe 69, as best shown in Fig. 3.

Said diaphragm 77 conveniently serves as a centering guide for the pipe 80 which is arranged to convey water from the water column and direct it into the inner end of the cuspidor flush nozzle pipe 69, and which is provided with the gooseneck 81 terminating at its free end in the tapered nozzle 82 depending through the aperture 79 into the pocket 62 in spaced relation to the inner and upper end of said cuspidor flush nozzle pipe 69, as best illustrated in Fig. 3, and is arranged to direct said water in an open stream through said pocket 62.

The inner end of said pipe 80 is provided with the fitting 85 which is generally rectangular in form and is dosposed upon the shelf 57 of the head 32, and which has the depending cylindrical projection 86 and the cylindrical depending extension 87 forming the seat 89 for the annular gasket 90 which is forced into water-tight engagement with the seat 91 in the chamber 92 by the set-screw 93 threadly engaged with the downset region 94 of the upper wall 95 of the U-shaped bracket arm 59.

Said chamber 92 is connected by the pipe 96, see Figs. 3 and 7, with the chamber or passageway 97 in the water column base 31, see Figs. 7 and 8, which chamber or passageway 97 communicates through the nipple 40, pipe 29 and nipple 37 with the flush water controlling valve 25, see Fig. 1.

The saliva ejector 99, having the gooseneck tube 100 and the globular terminal head 101, see Fig. 2, is supported when not in use, in the socket 102 provided therefor in the saliva ejector bracket 103, which projects forwardly from the cuspidor bracket arm frame 17, and may be conveniently withdrawn therefrom when desired for use in ejecting saliva from a patient's mouth.

Said saliva ejector 99 is connected by the looped flexible tube 105 through the threaded thimble 106 with the nipple 107 depending from the projection 110 extending forwardly from the drain fixture 6. Said nipple 107 communicates through the chamber 112 therein with the nipple 113 which is connected by the connection nut 115 with the saliva conveying pipe 116, which includes the elbow 117 and is connected by the connecting nut 119 with the nipple 120, all as shown in Figs. 1 and 2.

As shown in Fig. 8, the nipple 120 communicates with the chamber 121 connecting with the vertically extending passageway 122 which, as shown in Fig. 5, is connected by the pipe 123, extended upwardly through the drip receiving cup 47, with the transverse connecting passageway 125 which terminates in the conically floored pocket 126 in the water column head 32, said pocket 126 depending from the internally threaded chamber 127 which is sealed by the threaded cap 129 having the gasket 130.

As shown in Figs. 5 and 7, the chamber 127 is internally threaded to receive the water projecting nozzle 132 which has the bore 133 provided with the radial inlets 135 and the axial disposed outlet 136 extending through its conical nose 137 which depends into the pocket 126 and is arranged to project water in a turbulent flow through the discharge spout 139 which terminates in the air space between the head 32 and the subjacent drip receiving cup 47.

The chamber 127 is connected by the passageway 140 and pipe 141, extended through the drip receiving cup 47, with the vertically extending passageway 142 and its communicating chamber 143 in the base 31, which chamber 143 is connected through the nipple 45, connecting pipe 30, and nipple 42 with the water supply controlling valve 26.

Water admitted through the valve 26 is injected by the conical nose 137 into the discharge spout 139 and in passing through the conically floored pocket 126 said water is turbulent in its flow and creates a partial vacuum in the passageway between said pocket 126 and the globular head 101 of the saliva ejector 99, causing excess saliva in the mouth of the patient to be drawn through the flexible tube 105, pipe 116, passageway 122, pipe 123, passageway 125, into the conically floored pocket 126, and to be discharged with the stream of water flowing through the conical nose 137 and discharge spout 139 into the relatively spaced subjacent funnel 144, comprising a conical bore in the drip receiving cup 47.

As best shown in Fig. 5, the funnel 144 is connected by the fluid conveying column drainpipe 145 through the passageway 146 in the base 31 with the drain pipe extension 147 having the connecting nut 148 by which it is connected with the nipple 149 leading waste fluids into the drain fixture 6, see Fig. 1.

The upturned flange 49 of the drip receiving cup 47 affords a receptacle 150 which serves to catch the drip, spray, splash, or condensate incident to the passage of fluid from the discharge spout 139 to the funnel 144 through the intervening air gap, and in order to arrest any stray drops of such fluid that may possibly be splashed laterally, the splash guard 152, shown in Figs. 11 and 12, is provided.

Said splash guard 152 may preferably be composed of a strip of spring metal formed to embrace the area through which the fluid is directed from the spout 139 to the funnel 144, and to be sprung into engagement with the adjacent pipes leading through the drip receiving cup 47.

The vent pipe 155 extends slightly above the floor 157 of the cup 47 and terminates at its lower end in the base 31 in communication with the passageway 159 connected by the nipple 160 with the auxiliary drain outlet 162, comprising the gland nut 163, elbow 164, gland nut 165, coupling 166 and nipple 167 projecting laterally through the side wall of the drain fixture 6. Said vent pipe 155 conveniently serves to permit passage of air out of or into the drain fixture 6, and tends to maintain the air pressure therein at atmospheric pressure.

Any air that may be confined within the tubular casing 35 of the fluid conveying column may freely escape through the passageway 170 which communicates with the air outlet vent tube 171 having the flange 172 secured to the bottom of the base 31, see Figs. 3 and 5.

Said vent tube 171 is provided with the vent apertures 175 and 176 opening into the muffler 177 comprising the end boxing frame 179 which supports the outer housing, preferably formed of sheet material and including the end walls 180 and 181, side walls 182 and 183, the top wall 185 and bottom wall 186, the latter being upturned at its forward end to provide the lip 187 serving the dual purpose of affording the air outlet 189, and providing means for retaining the noise absorbing muffle units 190 and 191 in position with their inner respective ends 192 and 193 abutted against the forward edge of said end boxing frame 179 and so related as to provide the narrow air escape passageway 194. Said muffler 177 is conveniently supported on the vent tube 171 by the head 195 of the screw cap 196 that provides the closure for the lower end of said vent tube 171, with which it is screw-threadedly engaged.

As shown in Figs. 2, 3 and 5, the bracket arm 59 is covered by the casing shield 197 having the depending walls 198 embracing the water column head 32 and the cylindriform wall 75 of the pocket 62, and said shield 197 is removably secured to said bracket arm 59 by the screw 200, threadedly engaging the upper horizontal wall 95 of the U-shaped bracket arm 59, as particularly shown in Fig. 3.

Under normal conditions, the cuspidor flush water is admitted by the valve 25, when the controlling knob 27 is turned to open position, and is directed through the flush water conveying line or conduit including the pipe 29, passageway 97, pipe 96, chamber 92, fitting 85, pipe 80, air gap in the pocket 62 and the outwardly curved flush nozzle pipe 69, from where it is discharged upon the surface and floor 3 of the cuspidor bowl 1.

Said flush water traverses a spiral path over said floor 3 and spills through the funnel 11 into the cup 10 from where it overflows the upper edge of said trap cup 10 into the drain outlet fixture 6, and is discharged therefrom through the drain nipple 13 to the drain outlet, not shown.

From the foregoing description it will be obvious that should the drain outlet become clogged and the contents thereof back up into the drain fixture and into the cuspidor bowl 1, the fouled fluid therein can, by reason of the free air gap in the pocket 62, only rise in the flush nozzle pipe 69 to substantially the level of the upper edge of said cuspidor bowl 1.

Therefore, as there is no contact between the water in the supply conduit including the pipe 80 and the possibly contaminated waste water backed up into the cuspidor flush nozzle pipe 69 from the drainage system, the service water is maintained free from impurities.

Furthermore, should the pressure in the service line drop and tend to cause accidental back suction therein, the air gap in the pocket 62 would preclude sucking back into the pipe 80 and connected service system any contaminated drainage water from the cuspidor bowl 1.

Referring now more particularly to the structure by which the saliva ejector is actuated to withdraw excess saliva from the patient's mouth and by which it is insured against possible contamination with the drainage system, attention is directed to water supplied by the valve 26 and controlled by the knob 28, see Fig. 1, and directed by the pipe 30 to the base 31, see Fig. 5, through the passageway 142, pipe 141, passageway 148, into the chamber 127, thence through the inlets 135, bore 133 and outlet 136 in the downwardly tapered conical nozzle 137.

The discharge of the jet of water from said conical nozzle 137 tends to cause the water to expand laterally as it passes through the discharge nipple 139, and to create a partial vacuum in the pocket 126 causing a suction action, which may be effective when the globular terminal head is disposed in the mouth of the patient, to draw excess accumulation of saliva from the patient's mouth.

The saliva thus extracted from the patient's mouth is drawn through the gooseneck tube 100, flexible tube 105, saliva conveying pipe 116, chamber 121, passageway 122, column pipe 123 and passageway 125 into the pocket 126 where it commingles with the water ejected through the conical nose outlet 136 and passes therewith through the discharge spout 139 and air gap between the waste column head 32 and drip receiving cup 47 into the funnel 144 and through the drain pipe 145, passageway 146, drain pipe extension 147 and nipple 149 into the drain fixture from where it passes through the nipple 13 to a drain outlet. Any splash, spray or condensate which may accumulate in the basin 150 will flow into the funnel 144 and be delivered with the water flowing from the discharge nipple 139 into the drain fixture, as above described.

It may be here noted that should the drain outlet become clogged and drainage water back up in the drain fixture, and, as above described, fill the cuspidor bowl 1, the drainage water will only rise in the drain pipe 145 to the level of the top of said cuspidor bowl, which is lower than the free end of the discharge spout 139, and by reason of the interposed air gap between the column head 32 and drain cup 47, it will be impossible for any drainage to contaminate the water in the water supply system.

In such drainage devices there is likely to be a difference of air pressure either below or above atmospheric pressure that may cause objectional gurgling or hissing noises. Such pressure differences are herein substantially balanced within the tubular casing 35 by means of the free flow of air in either direction through the annular passageway 51, passageway 170, air vent tube 171, apertures 175 and 176, the chamber in the end boxing frame 179 and the narrow air passageway 194 between the sound absorbing muffler walls comprising the muffler units 190 and 191, and through the air vent 189.

The walls of the muffler comprising the muffler units 190 and 191 which are formed of sound absorbing material tend to arrest any objectional noise vibrations incident to the flow of water and incidentally combined air that may be gathered in its flow through the drainage system, and such noises are thereby prevented from escaping into the atmosphere.

It will be obvious that the assembly thus described not only provides a muffler that serves the purpose during normal operation of allowing trapped air to escape and the incidental noises to be substantially eliminated, but also facilitates the inflow of free air into the air gap to prevent drainage being sucked back into the water supply system without the attendant objectionable noise vibrations to be emitted where they may be heard.

Furthermore, the water supply is directed in a free stream through air gaps which are disposed above the plane of the drainage spillway, which insures its protection against any possible contamination with the drainage in the drainage system both under normal conditions or abnormal conditions incident to stoppage of the drain system and the consequent backing up of the drainage.

My invention is particularly advantageous in that the water for flushing the cuspidor bowl and the water for operating the saliva ejector aspirator is conveyed through assembled structure included in a unitary water and air distributing column and any trapped air and drip or condensate included in said column may freely escape therefrom through their respective passageways and be discharged without creating unpleasant sounds.

Although I have described my invention as being applied to a saliva ejector for use by the dental profession for ejecting saliva from the mouth of a patient, it is to be understood that it may as readily be applied to other uses and therefore, I do not desire to limit my invention to the precise details of construction and arrangement as herein set forth, as it is obvious that various modifications may be made therein without departing from the essential features of my invention as defined in the appended claims.

In fluid conveying systems of this type, as commonly employed, clogging and consequent stoppage of the drain passageways may occur, causing the water and waste matter carried thereby to back up and rise above the outlets of the water supply system until it overflows the upper edge of the cuspidor bowl or spillway. Should at such time the pressure in the water supply system fall below atmospheric pressure, the thus backed up drainage fluid in the waste outlet system may be siphoned back into the water supply system, thus permitting possible contamination of the water in said supply system by the drainage fluid, all of which is prevented by the structure herein described.

Having thus described my invention, I claim:

1. A fluid evacuating assembly comprising a device arranged to create a partial vacuum therein by passing water under pressure therethrough, a drain outlet spaced therefrom and providing an air gap through which said water may be projected in passing from said device to said drain outlet, a fluid conveying tube connected with said device and having its free end arranged to be inserted into the cavity containing said fluid whereby the vacuum thus created tends to withdraw the fluid from said cavity into said device to be discharged with the water passing therethrough, and sound absorbing means associated with said air gap and connecting it with the atmosphere.

2. A fluid evacuating assembly comprising a device arranged to create a partial vacuum therein by the passage of water under pressure therethrough, a drain outlet spaced therefrom, an enclosed air chamber separating said device from said drain outlet, through which said water may be projected in passing from said device to said drain outlet, a fluid conveying tube connecting said device with the fluid containing cavity whereby the vacuum thus created tends to evacuate the fluid in said cavity and cause it to be discharged with said water into said drain outlet, and a conduit connecting said air chamber with the atmosphere and including a passageway having walls composed of sound absorbing material.

3. A fluid evacuating assembly comprising a device arranged to create a partial vacuum therein by the passage of water under pressure therethrough and including a pocket having a discharge spout projecting therefrom, a flow restricting nose projecting into said pocket and having an outlet orifice of less diameter than the bore of said spout and arranged to project an expanded turbulent stream of water through said spout, a drain conveying conduit having its inlet spaced from the free outlet end of said spout, means providing an enclosed air chamber interposed between said spout and drain conduit through which said water is projected, a fluid conveying tube connecting said pocket with the fluid containing cavity whereby the vacuum thus created tends to evacuate the fluid in said cavity and cause it to be discharged with the water into said drain conduit, and means including sound suppressing elements arranged to connect said air chamber with the atmosphere.

4. A fluid evacuating assembly comprising a device arranged to create a partial vacuum therein by the passage, under pressure, of water therethrough and including an elongated outlet and a water passageway having a flow restricting orifice of less diameter than the bore of said outlet and arranged to project an expanded turbulent stream of water through said elongated outlet, a drain conductor having a discharge and an emergency spillway, and having its inlet spaced from said outlet, means providing an enclosed air chamber interposed between said outlet and inlet and disposed above the plane of said spillway and through which said water is projected from said outlet into said drain conductor through said inlet, a fluid conveying tube connecting said outlet with a fluid containing cavity whereby the vacuum thus created tends to evacuate the fluid in said cavity and cause it to be discharged with the water through said air chamber into said drain conductor, and means including sound deadening elements arranged to connect said air chamber with the atmosphere, and through which air from said air chamber may be discharged.

5. A fluid evacuating assembly comprising a device arranged to create a partial vacuum by the passage of water under pressure through a restricted orifice into an elongated passageway of relatively larger diameter wherein the jetted stream passing through said orifice expands in said passageway into a turbulent flow to create a partial vacuum, and a drain conductor having a discharge outlet and an emergency spillway, and having its inlet spaced from said passageway, and affording an interposed air chamber in communication with the atmosphere and disposed above the plane of said spillway.

6. A fluid evacuating assembly comprising a device arranged to create a partial vacuum by the passage of water under pressure through a restricted orifice into an elongated passageway of relatively larger diameter wherein the jetted stream passing through said orifice expands in said passageway into a turbulent flow to create a partial vacuum, and a drain conductor having a discharge outlet and an emergency spillway, and having its inlet spaced from said passageway, and affording an interposed air chamber in communication with the atmosphere and disposed above the plane of said spillway, and a fluid evacuating conductor connected with said vacuum creating device and having its free end adapted to be placed in a fluid containing cavity whereby the fluid contained therein may be drawn therefrom into said device and be discharged therefrom into said drain conductor.

7. A fluid evacuating assembly comprising a suction device actuated by the passage of water under pressure through a restricted orifice into an elongated passageway of relatively larger diameter wherein the jetted stream ejected from said orifice expands in said passageway into a turbulent flow whereby a partial vacuum may be created within a chamber in said device, a drain outlet conductor having a normal drain discharge outlet and an emergency spillway, and having its inlet spaced from said passageway by an intervening air gap in communication with the atmosphere and disposed above the plane of said spillway, a fluid evacuating conductor connected with said chamber and comprising a flexible tube terminating at its free end in a gooseneck intake arranged to be inserted into a cavity containing fluid to be evacuated, and means interposed between said air gap and the atmosphere, arranged to absorb noises incident to such evacuation.

8. A fluid evacuating assembly comprising a suction device actuated by the passage of water under pressure through a jet producing orifice and an adjacent pocket into an elongated passageway of relatively larger diameter than said orifice, wherein the jetted stream ejected from said orifice expands in its flow through said passageway into a turbulent stream which tends to create a partial vacuum in said pocket, means connecting said pocket with the source of fluid to be evacuated, a drain discharge conductor having a drain outlet and an emergency spillway, and having its inlet spaced from the free end of said passageway by an interposed air chamber connected with said drain conductor and disposed above the plane of said spillway, a shield embracing said air chamber, and a passageway connecting said air chamber with the atmosphere and including means tending to prevent the escape of sounds incidental to the evacuation of fluids through said assembly.

9. A fluid evacuating assembly comprising a suction device actuated by the passage of fluid under pressure through a jet producing orifice and an adjacent pocket, with an elongated passageway of relatively larger diameter than said orifice, wherein the jetted stream ejected from said orifice expands, in its flow through said passageway, into a turbulent stream which tends to create a partial vacuum in said pocket, means connecting said pocket with the source of liquid to be evacuated, a drain discharge conductor having a drain outlet and a spillway, and having its inlet spaced from the free end of said passageway by an interposed air chamber connected with said drain conductor and disposed above the plane of said spillway, a closure for said air chamber, a cuspidor having its outlet connected with said drain conductor, a flush water nozzle extended into said cuspidor and having its intake end disposed above the plane of said spillway, a service water conveyor arranged to direct flush water into said nozzle through an air gap interposed between the intake end of said nozzle and the outlet end of said service water conveyor, and a passageway connecting said air chamber with the atmosphere and including means tending to prevent the escape of any displeasing sounds incident to the change of pressure within said drain conduit.

10. A fluid evacuating assembly comprising a suction device actuated by the passage of fluid under pressure through a jet producing orifice and an adjacent pocket, with an elongated passageway of relatively larger diameter than said orifice, wherein the jetted stream ejected from said orifice expands, in its flow through said passageway, into a turbulent stream which tends to create a partial vacuum in said pocket, means connecting said pocket with the source of liquid to be evacuated, a drain discharge conductor having a drain outlet and a spillway, and having its inlet spaced from the free end of said passageway by an interposed air chamber connected with said drain conductor and disposed above the plane of said spillway, a closure for said air chamber, a cuspidor having its outlet connected with said drain conductor, a flush water nozzle extended into said cuspidor and having its intake end disposed above the plane of said spillway, a service water conveyor arranged to direct flush water into said nozzle through an air gap interposed between the intake end of said nozzle and the outlet end of said service water conveyor, a passageway connecting said air chamber with the atmosphere and including means tending to prevent the escape of any displeasing sounds incident to the change of pressure within said drain conduit and comprising a casing having an air passageway therein extending between walls formed of sound absorbing material.

11. A fluid evacuating assembly comprising a suction device actuated by the passage of fluid under pressure through a jet producing orifice and an adjacent pocket, with an elongated passageway of relatively larger diameter than said orifice, wherein the jetted stream ejected from said orifice expands, in its flow through said passageway, into a turbulent stream which tends to create a partial vacuum in said pocket, means connecting said pocket with the source of liquid to be evacuated, a drain discharge conductor having a drain outlet and a spillway, and having its inlet spaced from the free end of said passageway by an interposed air chamber connected with said drain conductor and disposed above the plane of said spillway, a closure for said air chamber, a cuspidor having its outlet connected with said drain conductor, a flush water nozzle extended into said cuspidor and having its intake end disposed above the plane of said spillway, a service water conveyor arranged to direct flush water into said nozzle through an air gap interposed between the intake end of said nozzle and the tapered outlet end of said service water conveyor which is connected with a conveniently controlled service pipe extended through said closure.

12. In combination a cuspidor and saliva evacuating assembly comprising a drain conductor arranged to swing about the axis of its outlet, a cuspidor carried therewith and having its outlet connected to discharge into said drain conductor and having its upper edge serving as a spillway for said conductor, a fluid distributing column arranged to move with said conductor and including a tubular casing through which the fluids incident to the operation of the assembly may be directed, a flush water nozzle swivelly supported, and having its free end extended into said cuspidor and its open inlet end disposed above the plane of said spillway, a service water conveyor extended through said column and having its tapered free end arranged to direct a restricted stream of flush water into said nozzle through an interposed air gap disposed above the plane of said spillway, a suction device actuated by service water under normal pressure directed through said column and forced through a jet producing orifice and an adjacent pocket, into an elongated passageway of relatively greater diameter, wherein the jetted stream expands into a turbulent stream which tends to create a partial vacuum in said pocket, a drain pipe connection extending into said drain conductor and having its upper end disposed in alinement with said passageway but spaced therefrom by an interposed air chamber disposed in said column, through which said turbulent stream is projected, means connecting said pocket with the source of saliva to be evacuated, an air passageway extending through said column and connecting said air chamber with said drain conductor, an air passageway leading through said column and connecting said air chamber with the atmosphere and including a sound muffler comprising a passageway extended between walls composed of sound absorbing material.

13. In combination a cuspidor and saliva evacuating assembly comprising a drain discharge conductor, a cuspidor having its outlet connected to discharge into said drain conductor, and having its upper edge serving as an emergency spillway for said drain conductor, a fluid distributing column comprising a base and head connected by a tubular casing through which the fluids incident to the operation of the assembly may be directed and enclosing an air chamber, a bracket arm detachably connected with said head and terminating at its free end in a hub, a flush water nozzle swivelly supported in said hub and having its free end extended into said cuspidor and its swivelled end disposed above the plane of said spillway, a service water conveyor extended through said column and connected in said head with a removable and replaceable extension having a tapered gooseneck outlet terminating in an air gap in said hub and arranged to project a restricted stream of flush water through said air gap into the relatively spaced swivelled end of said flush water nozzle, a removable and replaceable cap arranged to embrace said bracket arm and to shield the parts associated therewith, and means arranged to control the flow of flush water supply.

14. In combination a cuspidor and saliva evacuating assembly comprising a drain discharge conductor, a cuspidor having its outlet connected to discharge into said drain conductor, and having its upper edge serving as an emergency spillway for said drain conductor, a fluid distributing column comprising a base and head connected by a tubular casing through which the fluids incident to the operation of the assembly may be directed and enclosing an air chamber, a bracket arm detachably connected with said head and terminating at its free end in a hub, a flush water nozzle swivelly supported in said hub and having its free end extended into said cuspidor and its swivelled end disposed above the plane of said spillway, a service water conveyor extended through said column and connected in said head with a removable and replaceable extension having a tapered gooseneck outlet terminating in an air gap in said hub and arranged to project a restricted stream of flush water through said air gap into the relatively spaced swivelled end of said flush water nozzle, a removable and replaceable cap arranged to embrace said bracket arm and to shield the parts associated therewith, means arranged to control the flow of flush water supply, a suction device disposed in said column and arranged to be actuated by service water under normal pressure and comprising a threaded aperture in said head forming a conical pocket communicating with an elongated outlet passageway terminating into said air chamber, a screw plug adjustably disposed in said aperture and having a tapered end extended into said pocket and having a restricted outlet aperture arranged to direct a jet of water into said passageway, a screw cap arranged to seal the mouth of said aperture, means connecting said pocket with the source of saliva to be evacuated, a water supply pipe leading through said column and arranged to convey service water under normal pressure to said aperture, a drain outlet pipe in said column having its inlet end disposed in alined spaced relation to said elongated passageway and its outlet end connected with said drain conductor, an air vent pipe connecting said drain conductor with said air chamber, a vent passageway connecting said air chamber with the atmosphere and including a muffler comprising a narrow passageway extending between walls of sound absorbing material.

15. A cuspidor flush and drain assembly comprising a drain outlet conductor, a cuspidor having its outlet connected therewith, a flush nozzle swivelly supported with its free end extended into said cuspidor, a water supply pipe having a readily removable and replaceable section provided with a tapered outlet disposed above the plane of the upper edge of said cuspidor and spaced from the intake end of said flush nozzle, arranged to project a restricted stream of service water through the intervening air gap into said nozzle.

16. In a dental cuspidor, the combination with a cuspidor bowl suitably supported and connected with a drain outlet, of a water distributing and conveying unit comprising a water distributing head, a base having a plurality of conduits extended therethrough and an intermediate drip receiving cup, means connecting said conduits with corresponding passageways in said head and cup, a housing embracing said connecting means and forming a chamber, a bracket projecting laterally from said head and terminating in a pocket, a flush nozzle pipe swivelly engaged with said pocket and extended into said bowl, a pipe connected through said unit with a source of water supply and arranged to direct water into said flush nozzle pipe through an intervening air gap in said pocket, a drain outlet extended through said unit and connected with said cup, an aspirator arranged to discharge fluid into said cup through an intervening air gap in said housing, a conduit leading through said base and housing and arranged to supply water under pressure to said aspirator, and a saliva ejector connected with said aspirator, and a sound absorbing muffler having restricted air passageways extended therethrough and connected through an air conduit in said base with the chamber within said housing.

ROBERT C. ANGELL.